(12) United States Patent
Nicklous et al.

(10) Patent No.: US 7,984,656 B2
(45) Date of Patent: Jul. 26, 2011

(54) NSMS FLIGHT LASER DETECTOR SYSTEM

(75) Inventors: Allison Clark Nicklous, Moodus, CT (US); Edward F. Dreger, Burlington, CT (US); William F. Caswell, Baldwinsville, NY (US)

(73) Assignee: United Technologies Corporation, Hartford, CT (US)

( * ) Notice: Subject to any disclaimer, the term of this patent is extended or adjusted under 35 U.S.C. 154(b) by 365 days.

(21) Appl. No.: 12/220,368

(22) Filed: Jul. 24, 2008

(65) Prior Publication Data

US 2010/0018321 A1    Jan. 28, 2010

(51) Int. Cl.
*G01L 1/24* (2006.01)

(52) U.S. Cl. .......................................... 73/800

(58) Field of Classification Search ................ 73/800
See application file for complete search history.

(56) References Cited

U.S. PATENT DOCUMENTS

| | | | |
|---|---|---|---|
| 3,524,354 A * | 8/1970 | Frank et al. ................. | 73/455 |
| 3,555,452 A | 1/1971 | Nielsen et al. | |
| 4,053,227 A * | 10/1977 | Bodlaj ........................ | 356/3.02 |
| 4,112,774 A * | 9/1978 | Chadwick .................. | 73/455 |
| 4,242,666 A | 12/1980 | Reschovsky et al. | |
| 4,280,060 A | 7/1981 | Kure-Jensen et al. | |
| 4,501,095 A * | 2/1985 | Drinkuth et al. ........... | 451/5 |
| 4,931,729 A | 6/1990 | Pratt | |
| 4,983,034 A | 1/1991 | Spillman, Jr. | |
| 5,047,717 A | 9/1991 | Hofer | |
| 5,442,285 A | 8/1995 | Zombo et al. | |
| 5,625,446 A * | 4/1997 | Bedard ...................... | 356/3.08 |
| 6,239,504 B1 | 5/2001 | Gobrecht et al. | |
| 6,426,497 B1 | 7/2002 | Martinez et al. | |
| 7,065,471 B2 | 6/2006 | Gotoh et al. | |
| 7,206,709 B2 | 4/2007 | Griffin et al. | |
| 7,238,007 B2 * | 7/2007 | Wobben ..................... | 416/5 |
| 7,249,730 B1 | 7/2007 | Flippen, Jr. | |
| 7,341,428 B2 | 3/2008 | Twerdochlib | |
| 2004/0047536 A1 | 3/2004 | Pickrell et al. | |
| 2005/0198967 A1 * | 9/2005 | Subramanian ............. | 60/803 |
| 2006/0251507 A1 | 11/2006 | Braswell et al. | |
| 2007/0233415 A1 | 10/2007 | Babu et al. | |

* cited by examiner

*Primary Examiner* — Lisa M Caputo
*Assistant Examiner* — Octavia Davis
(74) *Attorney, Agent, or Firm* — Kinney & Lange, P.A.

(57) ABSTRACT

A method includes rotating a rotor, measuring a rotor rotational time for the rotor to complete a revolution, determining a blade interval by dividing the rotor rotational time by a number of blades carried on the rotor, establishing an active hold-off time interval as a percentage of the blade interval time, directing a beam of light at the blades of the rotor using a laser, sensing light reflected from the blades, generating an output signal as a function of the sensed light, establishing a signal amplitude threshold, analyzing an amplitude of the output signal to trigger the active hold-off time interval when the amplitude reaches the signal amplitude threshold, and generating a blade arrival signal as a function of triggered active hold-off time intervals. The output signal is not analyzed within each active hold-off time interval.

20 Claims, 4 Drawing Sheets

NSMS FLIGHT LASER DETECTOR SYSTEM

STATEMENT OF GOVERNMENT INTEREST

The present invention was developed, at least in part, under Contract No. N000019-02-C-3003 awarded by the United States Air Force. The U.S. Government has certain rights in this invention.

CROSS-REFERENCE TO RELATED APPLICATION(S)

The present invention is related to commonly-assigned U.S. patent application Ser. No. 12/220,421 entitled "NSMS Flight Laser Detector Cooling System" filed on even date herewith, which is hereby incorporated by reference in its entirety.

BACKGROUND

The present invention relates to non-interference stress measurement systems (NSMSs) for use with gas turbine engines.

Non-interference stress measurement systems (NSMSs) are known for collecting structural data about gas turbine engine components (e.g., using blade vibration measurements correlated to blade stress) that is used, in turn, for engine design purposes and for engine certification processes. Typically, these NSMSs have been configured for test stand applications. In other words, these NSMSs have been configured to gather data from prototype or other non-airframe-mounted gas turbine engines in a test facility. These systems utilize sensors to measure stress in engine components, and relay those signals to ground-based electronics that process the data. Generally, these known NSMSs have utilized large component cabinets located on the ground and linked to sensors on a test engine through fiber optic cable. An operator on the ground must calibrate and coordinate operation of these NSMSs. For instance, operators can manually set a hold-off period for sensed vibration data that remains fixed for a given test procedure, absent any further manual adjustments made by the operator to that fixed period. Operator involvement can decrease the accuracy and repeatability of NSMS measurements due to human error.

In some circumstances it is desirable or necessary to collect in-flight engine structural data while an engine is mounted to an airframe. However, known NSMSs generally cannot function in such in-flight situations. Furthermore, known systems are large and heavy, and cannot be readily mounted to an airframe for in-flight operation, and require a human operator.

SUMMARY

A method includes rotating a rotor, measuring a rotor rotational time for the rotor to complete a revolution, determining a blade interval by dividing the rotor rotational time by a number of blades carried on the rotor, establishing an active hold-off time interval as a percentage of the blade interval time, directing a beam of light at the blades of the rotor using a laser, sensing light reflected from the blades, generating an output signal as a function of the sensed light, establishing a signal amplitude threshold, analyzing an amplitude of the output signal to trigger the active hold-off time interval when the amplitude reaches the signal amplitude threshold, and generating a blade arrival signal as a function of triggered active hold-off time intervals. The output signal is not analyzed within each active hold-off time interval.

DETAILED DESCRIPTION

The present invention provides a non-interference stress measurement system (NSMS) and associated control method for collecting structural data about moving parts, such as rotating gas turbine engine components (e.g., using blade vibration measurement correlated to blade stress). The present invention allows structural data to be collected from an engine mounted to an airframe while in flight. The NSMS can include circuitry for automatically analyzing data in an active, dynamic fashion while in flight, which can increase precision and repeatability of measured data.

Figure 1:
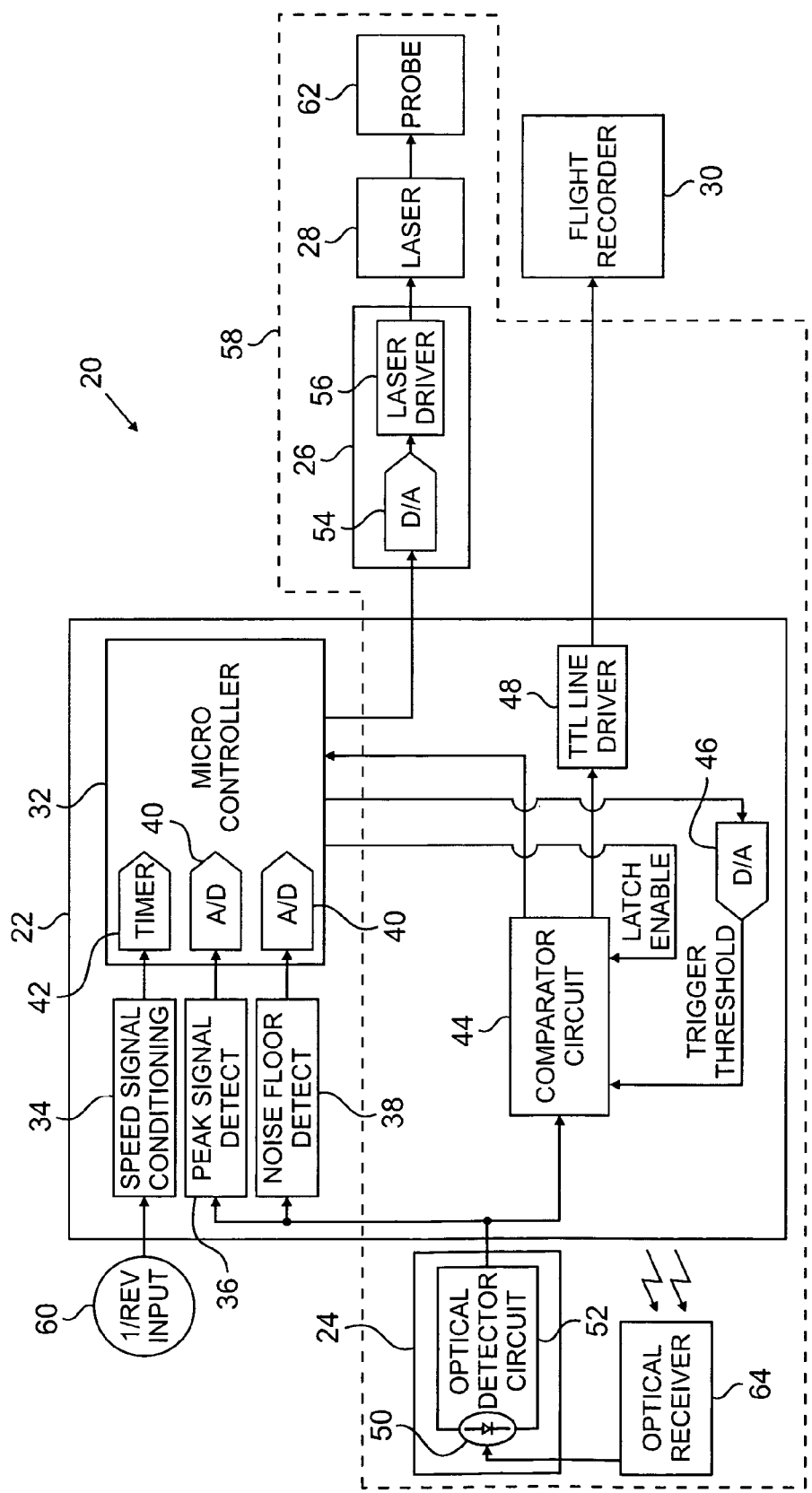
FIG. 1 is a block diagram of a non-interference stress measurement system (NSMS).

FIG. 1 is a block diagram of an exemplary NSMS 20 that includes a main circuit board 22, a detector circuit board 24, a laser/power circuit board 26, a laser 28 (e.g., a class 3B 350 mW laser), and a flight recorder 30. The main circuit board 22 can include a conventional microcontroller 32 (e.g., a 32-bit, 120 MHz microcontroller), speed signal conditioning circuitry 34, peak signal detection circuitry 36, noise floor detector circuitry 38, analog-to-digital (A/D) converters 40, timer circuitry 42, a comparator circuit 44, a digital-to-analog (D/A) converter 46, and a transistor-to-transistor logic (TTL) line driver 48. The detector circuit board 24 can include an optical detector 50 and an optical detector circuit 52. The laser/power circuit board 26 can include a D/A converter 54 and a laser driver 56. In alternative embodiments, the NSMS 20 can include additional components not shown in FIG. 1. For example, the components designated within box 58 can be replicated multiple times (e.g., with ten sets provided) within the NSMS 20, which can allow the provision of redundant components to maintain operation even in the event of failure of some components. Moreover, the laser/power circuit board 26 can further include a Peltier cooler controller (not shown) for controlling a Peltier cooler unit (not shown) used to cool components of the NSMS 20.

In operation, the NSMS 20 can gather data from rotating components, such as fan blades mounted on a rotor of a gas turbine engine in turn mounted to an airframe, and that data can be gathered while the airframe is in flight. A 1/REV input 60 is received from a sensor (e.g., a magnetic sensor configured to sense a flag on one of the fan blades), and is sent to the timer circuitry 42 of the microcontroller 32 via the speed signal conditioning circuitry 34 in order to determine a time for the rotating component to complete a single revolution. When testing a known number of rotating fan blades, the rotational time is divided by the number of fan blades in order to determine a blade interval time.

A power level supplied to the laser 28 by the laser driver 56 can be automatically adjusted during operation (and adjusted independently for each laser 28 in the NSMS 20). The optical detector circuitry 52 sends information to the microcontroller 22 via the peak signal detection circuitry 36 and the noise floor detection circuitry 38, which can determine a power level at which the laser 28 operates as explained further below.

Additionally, the laser 28 directs a beam of light to a probe 62 that focuses the beam of light toward the rotating fan blades, which is then reflected off the fan blades and collected by an optical receiver 64 that transmits the light to the optical detector 50 to be sensed. Optical fiber cables can connect the laser 28 to the probe 62 as well as the optical receiver 64 to the optical detector 50, for transmitting light to and from a location of the fan blades to a remote location where other NSMS 20 components are located. An analog output signal (e.g., a voltage signal) is then generated by the optical detector circuitry 52, which is sent to the microcontroller 22 via the peak signal detection circuitry 36 and the noise floor detection circuitry 38 and also to the comparator circuit 44. The microcontroller 32 analyzes the output signal and determines a trigger threshold as a function of information from the noise floor detection circuitry 38, which associates an amplitude of the output signal with an arrival of a fan blade as explained further below. The comparator circuit 44 analyzes the output signal compared to the trigger threshold to determine the arrival of each fan blade. A square wave digital blade arrival signal (e.g., a TTL signal) indicating the arrival of each fan blade, as determined by the comparator circuit 44, is then generated by the comparator circuit 44 and the TTL line driver 48 and sent to the flight recorder 30 for storage. The stored information on the flight recorder 30 can be retrieved subsequent to in-flight testing. The analog output signal need not be stored, which can allow only analytical results to be stored, taking up far less memory than the storage of raw data for later analysis. The blade arrival signal (or TTL signal) can be used to measure blade vibration over time, and through comparison of data collected over time for a given fan blade at different circumferential locations (e.g., using sensors at different circumferential locations), fan blade stress levels can be assessed.

An active hold-off period can be triggered upon detection of the arrival of a fan blade, that is, when the output signal amplitude crosses the trigger threshold. The active hold-off period can be a time period of approximately 60-90% of the blade interval time, such as 87.5% of the blade interval time. In this way, the exact length of time comprising the active hold-off period can vary as a function of the 1/REV input 60 for each revolution of the rotor carrying the fan blades, which in turn is a function of engine speed, making this an active, dynamic and automated determination rather than a passive, one-time and/or manual determination. During the active hold-off period, the output signal need not be analyzed, in effect allowing sensed optical data following the arrival of a given fan blade to be ignored until a time shortly before the arrival of an adjacent fan blade is expected. The active hold-off period helps reduce a risk of data errors, by reducing a risk of a waveform artifacts (e.g., a random spike in output signal amplitude) being confused with a blade arrival. For instance, light reflected off trailing edge portions of the fan blades can essentially be ignored, thereby reducing a risk of that trailing edge being confused with the arrival of the leading edge of the next fan blade. In prior art NSMSs, which were more like supervisory systems than analyzer systems, hold-off periods were set manually by a human operator using ground-based equipment, on generally a one-time basis, and the hold-off period was subject to operator-induced variation.

The blade arrival signal can be generated as a function of the trigger threshold, which initiates the active hold-off period. For instance, the blade arrival signal can be latched to a "high" state upon triggering of an active hold-off period, then reset by command of the microcontroller 32 to a "low" state upon the completion of the active hold-off period.

The NSMS 20 can also include a cooling system. Further details of the operation of the NSMS 20 as found in the commonly-assigned U.S. patent application entitled "NSMS Flight Laser Detector Cooling System" filed on even date herewith, which is hereby incorporated by reference in its entirety.

Figure 2:
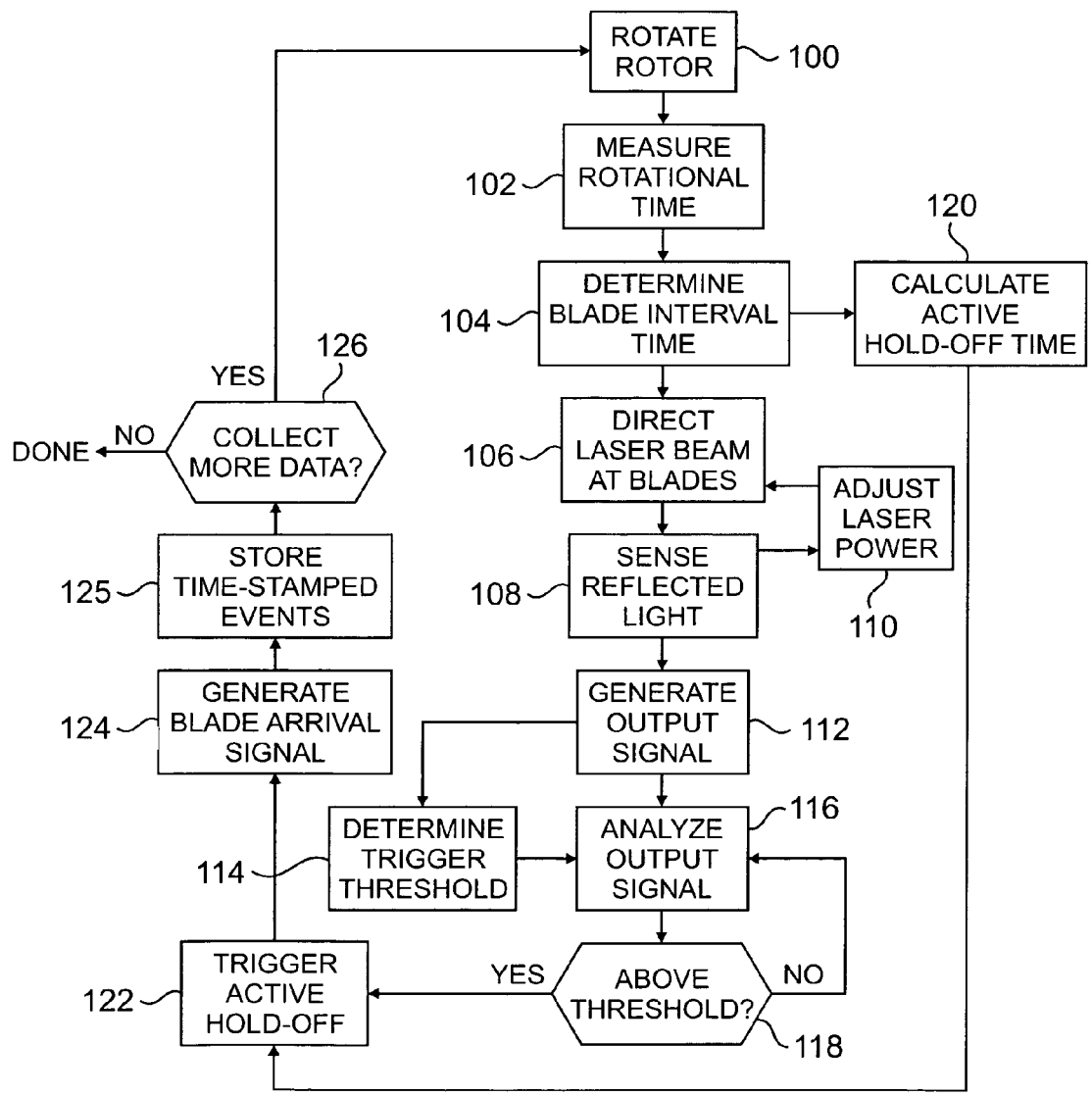
FIG. 2 is a flow chart of a NSMS control method according to the present invention.

FIG. 2 is a flow chart of a NSMS control method. Initially, a rotor carrying fan blades or other components to be tested is rotated (step 100). At this step, an airframe carrying an engine and the components to be tested can achieve flight, if desired, such that subsequent testing can be performed during flight. As the rotor rotates, a rotational time is measured to obtain the 1/REV input 60 (step 102). This rotational time can be substantially continuously measured, that is, continuously updated to provide a measurement based on engine operational speed. Next, a blade interval time is determined as a function of the measured rotational time (step 104). The blade interval time can be calculated by dividing the measured rotational time by the number of fan blades, which is typically a known value stored within the NSMS 20. For example, if the measured rotational time is twenty-eight seconds and the rotor carries twenty-eight fan blades, then the blade interval time is one second.

A beam of light generated by a laser 28 is directed, by way of the probe 62, at the rotating fan blades (step 106). Multiple beams of light are generated in embodiments where the NSMS 20 includes a plurality of lasers 28. Each beam of light is then sensed by a corresponding optical detector 50, by way of the optical receiver 64, as the light reflects off the rotating fan blades (step 108). During operation (e.g., approximately every ten seconds), the NSMS 20 can adjust a power level of the laser 28 (step 110). A power level supplied to the laser 28 by the laser driver 56 can be automatically adjusted during operation (and adjusted independently for each laser 28 in the NSMS 20). The laser power can be initially set at a specified level (e.g., approximately 20% of full power). After two revolutions of the rotor, for example, the peak signal detection circuitry 36 measures a reflected peak signal from the blade, and the laser power level is increased as necessary until the peak signal reaches a specified range (e.g., between approximately 3.7 to 4 volts). This procedure helps to account for the numerous variables that affect the amount of reflected energy sensed by the optical detector 50 for a given laser power setting.

The optical detector circuit 52 generates an analog output signal as a function of reflected light sensed by the optical detector 50 (step 112). The microcontroller 32 analyzes the output signal and determines a trigger threshold as a function of information from the noise floor detection circuitry 38 (step 114). The trigger threshold associates an amplitude of the analog output signal with an arrival of a fan blade. In one embodiment, the NSMS 20 can be configured to associate noise floor ranges with particular trigger threshold levels (e.g., using a lookup table). For example, a noise floor below approximately 100 mV can be associated with a trigger threshold level of approximately 0.6 V, a noise floor within a range of approximately 100 mV to 300 mV can be associated with a trigger threshold level of approximately 0.7 V, a noise floor within a range of approximately 300 mV to 500 mV can be associated with a trigger threshold level of approximately 0.8 V, a noise floor within a range of approximately 500 mV to 700 mV can be associated with a trigger threshold level of approximately 0.9 V, and a noise floor within a range of approximately 700 mV to 900 mV can be associated with a trigger threshold level of approximately 1.0 V.

The comparator circuit 44 analyzes the output signal compared to the trigger threshold to determine the arrival of each fan blade (step 116). A decision is made as to when an amplitude of the output signal crosses the trigger threshold (step 118). If the amplitude of the output signal is below the trigger threshold, arrival of a fan blade has not yet occurred and analysis of the output signal continues. If the amplitude of the output signal reaches or surpasses the trigger threshold, then arrival of a fan blade is detected.

An active hold-off time is calculated as a function of the blade interval time previously determined at step 104 (step 120). The active hold-off time can be a time period of approximately 60-90% of the blade interval time, such as 87.5% of the blade interval time. In this way, as discussed above, the exact length of time comprising the active hold-off period can vary as a function of the 1/REV input 60 for each revolution of the rotor carrying the fan blades, which in turn is a function of engine speed. When the output signal is determined to meet or exceed the trigger threshold at step 118, the active hold-off time period is triggered (step 122). In other words, triggering the active hold-off time period substantially coincides with fan blade arrival.

A digital fan blade arrival signal is then generated by the comparator circuit 44 and the TTL line driver 48 as a function of the trigger threshold, which initiates the active hold-off period (step 124). For instance, the blade arrival signal can be latched to a "high" state (e.g., one) upon triggering of an active hold-off period, then reset by command of the microcontroller 32 to a "low" state (e.g., zero) upon the completion of the active hold-off period. Time-stamped events indicated by the blade arrival signal can then be stored by the flight recorder 30 (step 125). For instance, blade arrivals corresponding to a transition of the blade arrival signal from a low state to a high state, which corresponds to the triggering of an active hold-off period.

A determination can then be made as to whether additional data is to be collected (step 126), such as with a record enable switch controllable by a pilot. If not, that is, if testing is complete, then the process can end. If additional data collection is sought, then the process described above can repeat as the rotor continues to rotate at step 100. The blade arrival signal can then be analyzed in a conventional manner to assess variations in blade arrivals at various circumferential locations associated with NSMS sensing locations, in order to assess fan blade vibration and stress.

Figure 3:
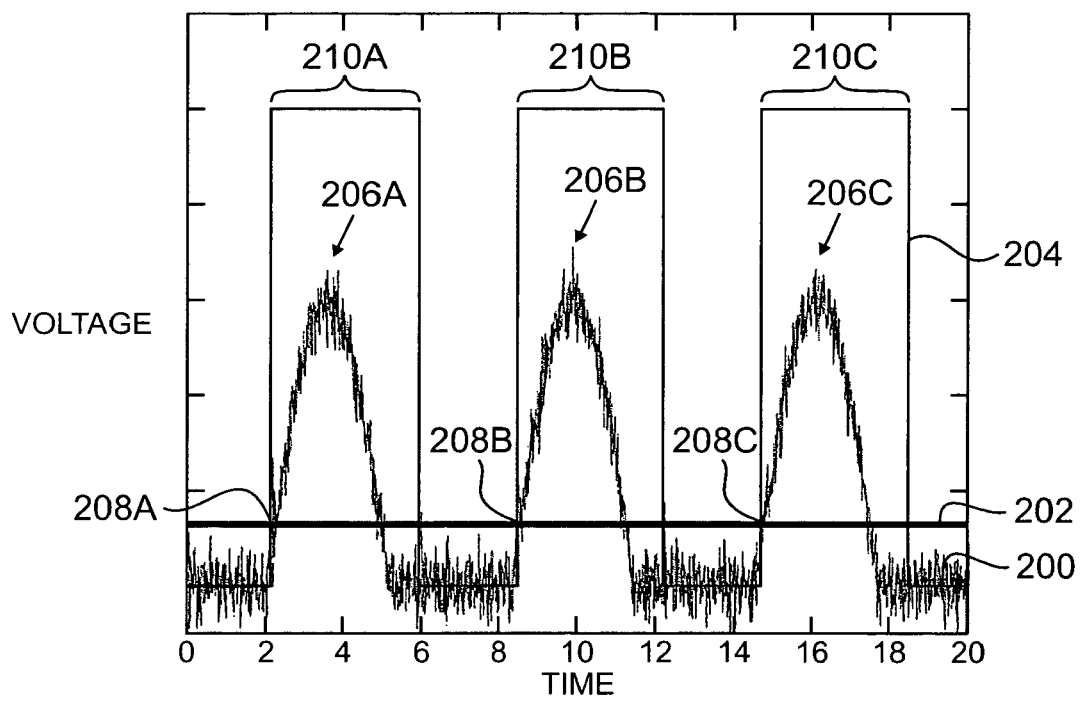
FIG. 3 is a graph of voltage (V) over time illustrating an analog output signal and a digital blade arrival signal.

FIG. 3 is a graph of voltage (V) over time illustrating an analog output signal 200, a trigger threshold 202, and a digital blade arrival signal 204. As shown in FIG. 3, the amplitude of the output signal 200 is measured as voltage, which varies over time as a function of light from the laser 28 reflected off the rotating fan blades and sensed by the optical detector 50. Generally, the amplitude of the output signal 200 increases as light is reflected off a given fan blade, and decreases in between fan blades, that is, at times when no fan blade is present to reflect the light. As shown in FIG. 3, three fan blades are represented in the output signal 200, corresponding to local peaks 206A-206C.

As discussed above, the trigger threshold 202 can be established at a particular voltage level as a function of a noise floor of the output signal 200. The arrivals of fan blades are indicated at points 208A-208C where the output signal 200 crosses the trigger threshold 202. The output signal 200 generally crosses the trigger threshold 202 at or near the time when a leading edge of the fan blade passes the sensors of the NSMS 20. When a given blade arrival occurs at points 208A-208C, a corresponding active hold-off time period 210A-210C is triggered. Each active hold-off time period can have duration established as a function of blade interval time, as discussed above. The active hold-off time period reduces a risk of error in detecting blade arrivals. For instance, light reflected off a given blade may produce unexpected variations in amplitude of the output signal, meaning that a given fan blade might undesirably trigger the detection of multiple arrivals. To lessen that risk, the active hold off time periods 210A-210C allow portions of the output signal 200 to effectively be skipped over, with analysis of the output signal 200 for fan blade arrive resumed shortly before the next arrival is expected (based upon the blade interval time).

The blade arrival signal 204 can be generated as a function of reaching the trigger threshold 202, which initiates the active hold-off periods 210A-210C. For instance, the blade arrival signal can be latched to a "high" state (e.g., one value) upon triggering of an active hold-off period at points 208A-208C, then reset by command of the microcontroller 32 to a "low" state (e.g., zero value) upon the completion of the active hold-off periods 210A-210C. The blade arrival signal 204 can therefore be represented as a square wave, with the triggering of the high state corresponding to the triggering of the active-hold-off periods 210A-210C and the arrival of fan blades at points 208A-208C, which are time-stamped and stored by the flight recorder 30. Use of the blade arrival signal 204 allows at least partially analyzed data to be stored, rather than merely raw data stored for later analysis. This allows a savings in memory requirements over storage of the output signal 200, as well as savings in data processing burdens. These features facilitate data collection and analysis during in-flight testing.

Figure 4:
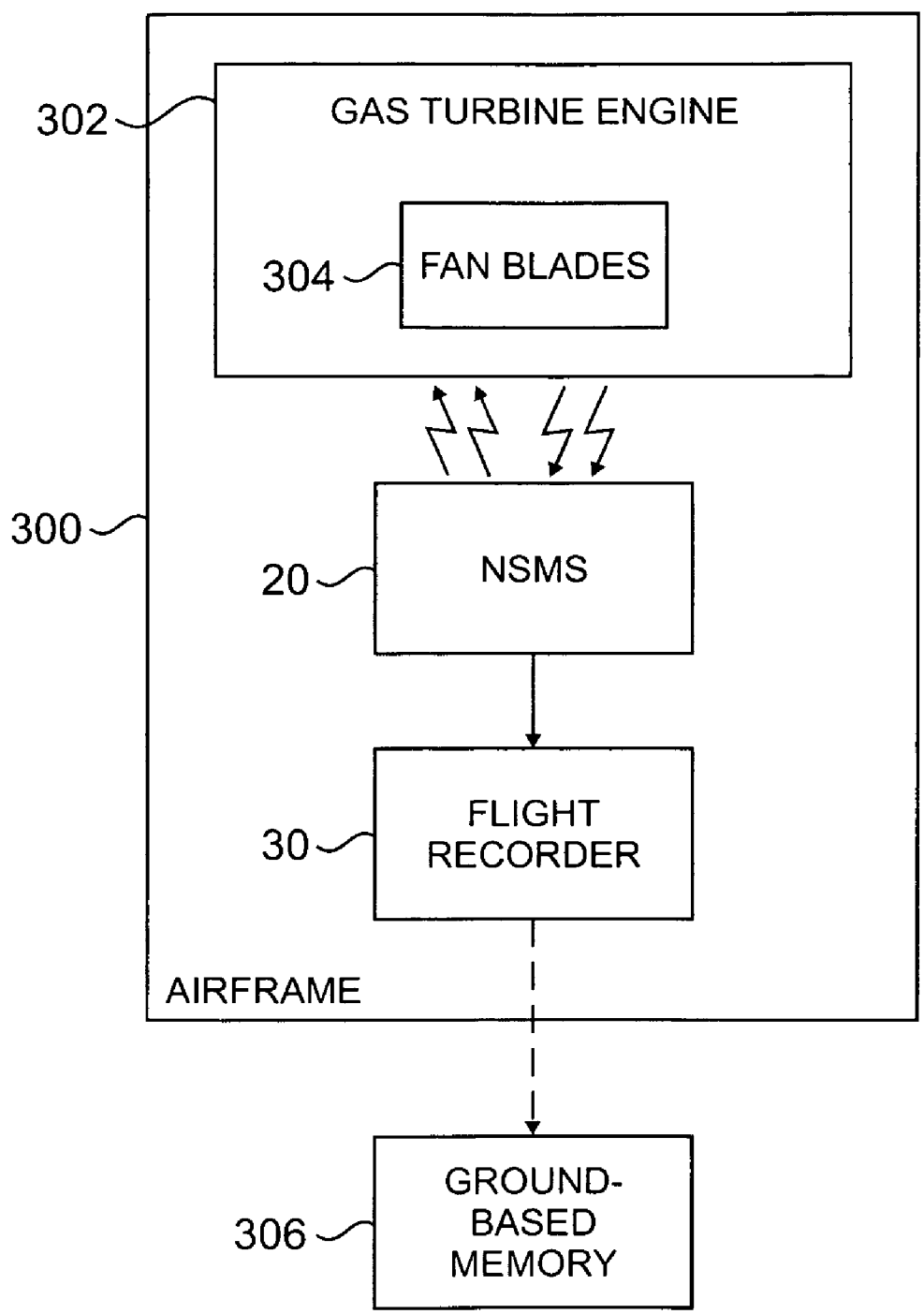
FIG. 4 is a block diagram of the NSMS installed on an airframe.

FIG. 4 is a block diagram of an airframe 300 that carries a gas turbine engine 302, the NSMS 20, and the flight recorder 30. The gas turbine engine 302 includes fan blades 304. In one embodiment, the airframe 300 comprises a short take-off vertical landing (STOVL) aircraft and the fan blades 304 are for a lift fan. The NSMS 20 is configured to direct light toward and sense light reflected from the fan blades 304. In this way, data, such as the time-stamps associated with blade arrival events (derived from the blade arrival signal 204), can be generated and stored while the airframe 300 is in flight. Data stored by the flight recorder 30 can be transferred to ground-based memory 306 after flight, using suitable data transfer means.

It will be recognized that the present invention provides numerous advantages. For example, the present invention can allow NSMS data collection during in-flight conditions. Moreover, control of NSMS data collection can be further automated over prior art systems that utilized hold-off periods set manually by a human operator using ground-based equipment, on generally a one-time basis, thereby increasing precision and reducing operator-induced variation. More particularly, hold-off times can be determined actively and correlated with variable engine speeds, and trigger thresholds can be determined actively based upon empirically determined noise levels of sensed data.

Although the present invention has been described with reference to preferred embodiments, workers skilled in the art will recognize that changes may be made in form and detail without departing from the spirit and scope of the invention. For instance, the methods of the present invention can be applied to nearly any rotating parts, and are not limited to testing fan blades.

The invention claimed is:

1. A method comprising:
   rotating a rotor;
   measuring a rotor rotational time for the rotor to complete a revolution;

determining a blade interval by dividing the rotor rotational time by a number of blades carried on the rotor;
establishing an active hold-off time interval as a percentage of the blade interval time;
directing a beam of light at the blades of the rotor using a laser;
sensing light reflected from the blades;
generating an output signal as a function of the sensed light;
establishing a signal amplitude threshold;
analyzing an amplitude of the output signal to trigger the active hold-off time interval when the amplitude reaches the signal amplitude threshold, wherein the output signal is not analyzed within each active hold-off time interval; and
generating a blade arrival signal as a function of triggered active hold-off time intervals.

2. The method of claim 1 and further comprising:
storing time-stamped events as a function of the blade arrival signal.

3. The method of claim 2, wherein storage of the time-stamped events takes up less memory that would be taken up by storing the output signal.

4. The method of claim 1, wherein the blade arrival signal is digital.

5. The method of claim 1, wherein the output signal is analog.

6. The method of claim 1, wherein the rotor is mounted to an airframe, and is rotated to achieve flight.

7. The method of claim 6, wherein the steps of analyzing the amplitude of the output signal to trigger the active hold-off time interval and generating the blade arrival signal as a function of triggered active hold-off time intervals are performed by circuitry carried by the airframe.

8. The method of claim 1, wherein the active hold-off time interval is approximately 60-90% of the blade interval time.

9. The method of claim 8, wherein the active hold-off time interval is approximately 87.5% of the blade interval time.

10. The method of claim 1 and further comprising:
adjusting a power level of the laser used to direct the beam of light, comprising the steps of:
setting a power level of the laser;
determining a peak signal for light reflected from the blades; and
increasing the power level of the laser as a function of the peak signal.

11. A method comprising:
rotating a rotor carried by an airframe;
determining a blade interval by dividing a rotor rotational time by a number of blades carried on the rotor;
establishing an active hold-off time interval as a percentage of the blade interval time;
directing a beam of light at the blades of the rotor using a laser;
sensing light reflected from the blades;
generating an output signal as a function of the sensed light;
establishing a signal amplitude threshold;
analyzing an amplitude of the output signal to trigger the active hold-off time interval when the amplitude reaches the signal amplitude threshold, wherein the output signal is not analyzed within each active hold-off time interval, and wherein the step of analyzing the amplitude of the output signal occurs while the airframe is in flight; and
generating a blade arrival signal as a function of triggered active hold-off time intervals.

12. The method of claim 11 and further comprising:
storing time-stamped events as a function of the blade arrival signal.

13. The method of claim 11, wherein the blade arrive signal is digital, and wherein the output signal is analog.

14. The method of claim 11 and further comprising:
measuring the rotor rotational time for the rotor to complete a revolution.

15. The method of claim 11, wherein the rotor is mounted to an airframe, and is rotated to achieve flight.

16. The method of claim 15, wherein the steps of analyzing the amplitude of the output signal to trigger the active hold-off time interval and generating the blade arrival signal as a function of triggered active hold-off time intervals are performed by circuitry carried by the airframe.

17. The method of claim 11, wherein the active hold-off time interval is approximately 60-90% of the blade interval time.

18. The method of claim 17, wherein the active hold-off time interval is approximately 87.5% of the blade interval time.

19. The method of claim 11 and further comprising:
adjusting a power level of the laser used to direct the beam of light, comprising the steps of:
setting a power level of the laser;
determining a peak signal for light reflected from the blades; and
increasing the power level of the laser as a function of the peak signal.

20. A method for non-interference stress measurement of an aircraft component or gas turbine engine component, the method comprising:
rotating a rotor carrying a plurality of blades;
directing a beam of light at the blades of the rotor using a laser;
sensing light reflected from the blades;
adjusting a power level of the laser used to direct the beam of light, comprising the steps of:
setting a power level of the laser, wherein the power level of the laser governs power supplied to the laser from a laser driver to generate the beam of light;
determining a peak signal for light reflected from the blades; and
increasing the power level of the laser as a function of the peak signal; and
generating an output signal as a function of the sensed light.

* * * * *